United States Patent [19]

Kober et al.

[11] Patent Number: 4,940,448
[45] Date of Patent: Jul. 10, 1990

[54] BRAKING DEVICE FOR DRIVE BELTS

[75] Inventors: Jürgen Kober, Schwebheim; Manfred Brandenstein, Eussenheim, both of Fed. Rep. of Germany

[73] Assignee: SKF GmbH, Schweinfurt, Fed. Rep. of Germany

[21] Appl. No.: 273,413

[22] Filed: Nov. 18, 1988

[30] Foreign Application Priority Data

Nov. 20, 1987 [DE] Fed. Rep. of Germany ....... 3739373

[51] Int. Cl.$^5$ .............................................. F16H 7/08
[52] U.S. Cl. ..................................... 474/111; 474/135
[58] Field of Search ................ 474/101, 109, 111–113, 474/115, 117, 133, 135

[56] References Cited

U.S. PATENT DOCUMENTS

| | | | |
|---|---|---|---|
| 4,571,222 | 2/1986 | Brandenstein et al. | 474/135 X |
| 4,596,538 | 6/1985 | Henderson . | |
| 4,813,915 | 3/1989 | Kotzab | 474/135 |

*Primary Examiner*—Thuy M. Bui
*Attorney, Agent, or Firm*—Rosen, Dainow & Jacobs

[57] ABSTRACT

In a braking device for a drive belt, sector-shaped damping elements are mounted near the swivel bearing of the braking device, in an annular section turned away from the drive belt. This arrangement permits the drive belt to be positioned very close to the swivel axis and saves space, particularly in engine blocks having a number of accessory items and little free space. The spring-loaded mounting of the braking device can be achieved by an axially adjoining flat coil springs in the area of the swivel bearing or by a helical spring in an offset position with respect to the swivel axis.

6 Claims, 2 Drawing Sheets

BRAKING DEVICE FOR DRIVE BELTS

BACKGROUND OF THE INVENTION

1. Field of the Invention

The invention concerns a braking device for drive belts. In particular, the device comprises a swivel arm, a rotatable idler attached to one end of the swivel arm adjoining the drive belt, a swivel bearing with damping elements acting in the swivel direction and spring elements acting in the swivel direction.

2. Description of the Prior Art

A braking device of this type is disclosed in DE-OS 3 590 411. In this disclosure, the end of the swivel arm away from the idler is equipped with a swivel bearing. A flat coil spring mounted coaxially above and to one side of the swivel bearing preloads the swivel arm in the swivel direction against the drive belt via the idler. On the other side of the swivel bearing an axial preloaded damping element operates in a circumferential direction to protect the swivel motion from the effects of friction. This arrangement allows little vertical space for the braking device near the swivel bearing. As a result the radial extension is considerably larger. Thus, a swivel bearing of this type cannot be installed in very narrow configurations at the front of an engine block without coming into contact with the drive belt.

SUMMARY AND OBJECTS OF THE INVENTION

The main object of the invention is to provide a braking device with a compact combination of a swivel bearing, damping elements and spring elements, which permits installation of the braking device as close to the drive belt as possible. This is particularly advantageous when space is limited.

The foregoing object is met by positioning the damping elements asymmetrically to the swivel axis on a circumferential section of the drive belt diametrically opposite the swivel axis.

In one embodiment of this invention, the swivel bearing comprises, for example, a sleeve-shaped sliding bearing having a small diameter so that the swivel axis is at an overall short distance from the drive belt even when the swivel bearing is installed close to the drive belt. In accordance with this embodiment of the invention, the damping elements are installed only on a more or less semi-circular section of the circumference of the swivel bearing on one side of the drive belt. Depending on the available space, this may be outside or inside the drive belt loop. The braking device of this invention requires less space due to the proximity of the swivel axis to the drive belt. This is advantageous as the braking device of the invention may be used in small motors, or in motors where the amount of accessory equipment reduces the available space, while providing the same good braking and damping properties as larger devices According to another feature of the invention, the damping elements are sector-shaped and operate axially. The damping elements are formed as partial sections of a damping ring. With their partially annular side surface under axial pressure, the damping elements adjoin a suitable leaf spring or similar spring element on a corresponding radial surface of the fixed component, e.g., a carrier plate of the braking device. This arrangement provides a large frictional area with sufficient circumferential speed during swivel motion for high friction damping. The asymmetrical arrangement of the damping elements yields higher damping values for equal friction areas than the closed ring embodiment due to the higher circumferential speed. The size of the sectors in the direction of the circumference and the required swivel angle can be adapted each time to the partial circumference determined by the drive belt. In each case, attention should be paid to guarantee that in the two extreme positions of the swivel motion no contact with the drive belt occurs.

In another embodiment of the invention the spring element is a helical spring with inside radially arranged damping elements and inside radially arranged swivel bearings, whereby the swivel axis is offset with respect to the central axis of the helical spring. In this embodiment the helical spring loops around the swivel bearing and the asymmetrically arranged damping elements. The spring ends are arranged in such a manner that the swivel arm is restrained in the swivel direction In this configuration, the radial extension of the spring windings requires only slightly more room in the radial direction of the swivel bearing.

A further embodiment of the invention has a flat coil spring adjoining the side surface of the drive belt at least at one axial end of the swivel bearing. When the available radial space is not sufficient, a flat coil spring axially adjoining the damping elements or the swivel bearing can be used as a spring element to generate a tension force. In this embodiment, which requires more axial space, the intermediate spaces between the drive belt and the engine block may be utilized. In accordance with the invention, this embodiment does not interfere with the installation of the swivel bearing close to the belt.

BRIEF DESCRIPTION OF THE DRAWINGS

Further objects and advantages of the invention will appear from the following description as well as from the accompanying drawings which illustrate various embodiments of the invention. It will be understood that the invention is not limited to the embodiments described and that the drawings are for purposes of illustration only and are not intended as a definition of the limits of the invention. Similar reference numerals refer to similar elements throughout the several views

DETAILED DESCRIPTION OF PREFERRED EMBODIMENTS

Figure 1:
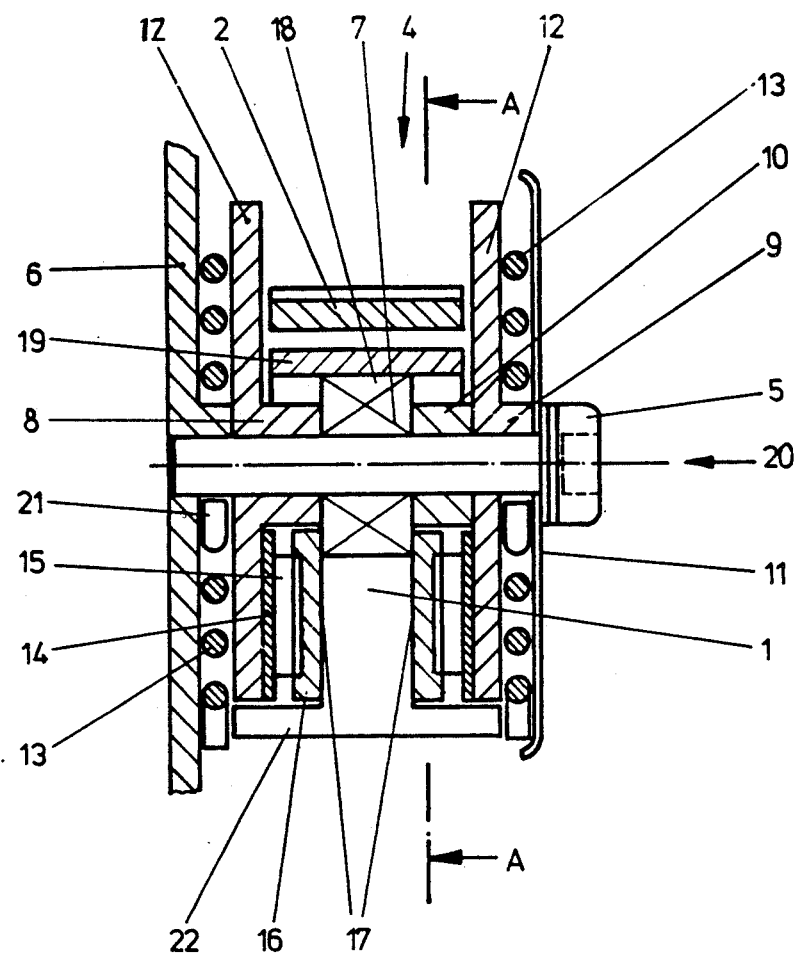
FIG. 1 is a longitudinal sectional view along lines B—B of FIG. 2, showing the swivel bearing of a braking device with asymmetrically arranged damping elements and two flat coil springs.
Figure 2:
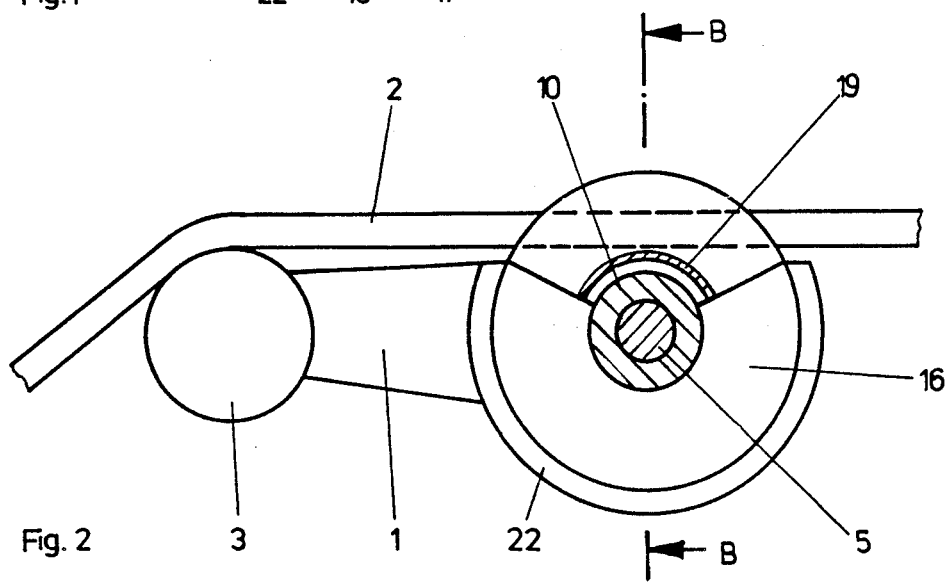
FIG. 2 is a cross-sectional view along lines A—A of the braking device shown in FIG. 1.

The braking device shown in FIGS. 1 and 2 consists essentially of a swivel arm 1, an idler 3 rotatably attached to one end of the swivel arm and adjoining the drive belt 2, and a swivel bearing 4 mounted on the other end of the swivel arm 1. FIG. 2 shows a simplified version of this arrangement. As indicated in FIGS. 1 and 2, the end section of the braking device is connected to a carrier plate 6 This plate is connected to an engine block or similar structure, not shown here. The swivel bearing 4 is fastened with its inside ring 7 to the carrier plate 6 via a flange part 8 by means of a bolt 5. Another flange part 9 together with a spacer 10 and a cover disk 11 are clamped in a torsion-proof manner between the head of the bolt 5 and the inside ring 7. The flange sections 12 of the flange parts 8, 9 restrict the annular spaces for two axially mounted, outside flat coil springs 13 The flange sections 12 also constitute sector shaped annular sections which serve as supporting surfaces for leaf springs 14 from which axially bent spring tabs 15 jut out. These tabs 15 adjoin sector-shaped damping elements 16 and push the damping elements against the partially annular radial surface 17 of the swivel arm 1. In this embodiment, the swivel arm 1 has a seat for the outside ring 18 of the swivel bearing 4, which is solid near the damping elements 16 and, besides the damping elements 16, adjoins a thin-walled, supplementary partial ring 19, also shown in FIG. 2. Partial ring 19 together with flange sections 12 restrict flange parts 8, 9 in a clearance which is U-shaped in longitudinal section and through which the drive belt 2 runs. Consequently, the drive belt 2 is very close to the swivel axis 20 of the swivel bearing 4. The free ends 21 of the flat coil springs 13 interlock solidly with the carrier plate 6 or with the torsion-proof flange part 9 and also interlock with a partial sleeve-shaped section 22 of the swivel arm 1. This creates a spring tension in a swivel direction against the drive belt 2.

Figure 3:
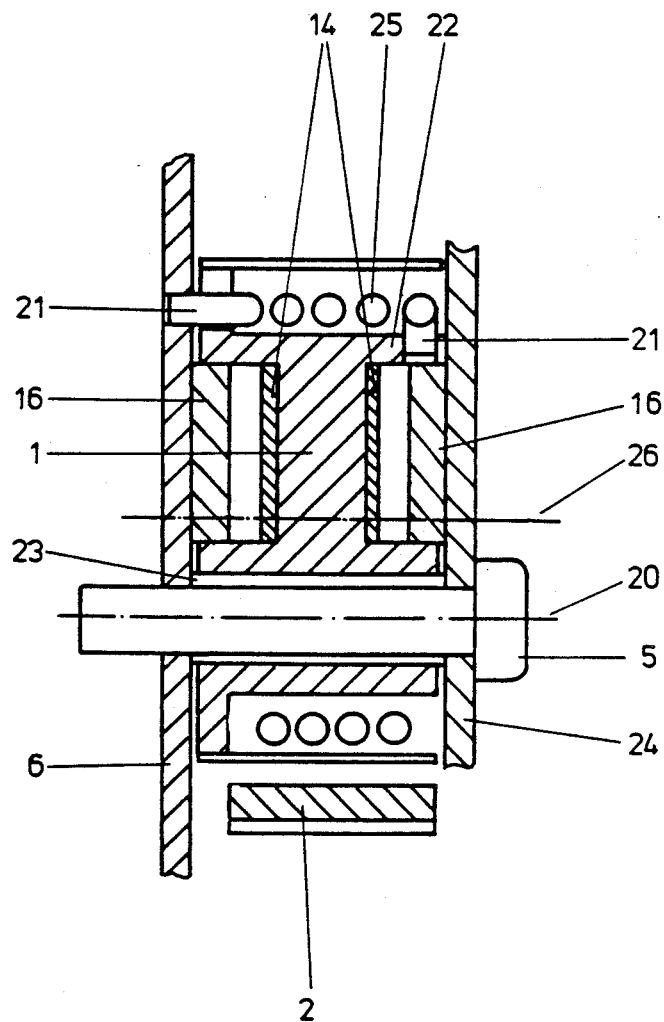
FIG. 3 is a longitudinal sectional view of a swivel bearing of a braking device having a helical spring.

FIG. 3 shows a longitudinal section of a different embodiment of the end section of the swivel arm 1 which, however, is comparable to the sectional plane along line B—B of FIG. 2 with regard to the sectional direction In this embodiment, the swivel bearing 4 consists of a sleeve-shaped sliding bearing 23 of short radial height. This is adjoined in a radial direction by a combination of sector-shaped damping elements 16 which are comparable in execution and function with the embodiment shown in FIG. 1. However, in the embodiment of FIG. 3, the damping elements 16 follow the swivel motion and adjoin corresponding radial planes of the fixed carrier plate 6 and a support disk 24. The sliding bearing 23 and the damping elements 16 are surrounded by a helical spring 25 with axially arranged windings whose end 21 interlocks with the carrier plate 6 or a partial sleeve-shaped section 22 of the swivel bearing, and exercises a spring action in the swivel direction against the drive belt 2 on the swivel arm 1 and the idler 3—not shown here but comparable to the idler in FIG. 2. The swivel axis 20 of the sliding bearing 23 is radially greatly off-set relative to the central axis 26 of the helical spring 25 and the geometric center of the total end section of the swivel arm 1, so that the drive belt 2 in this example, too, saves space by moving very closely to the sliding bearing 23 or its swivel axis 20. Other modifications and variations will be evident to those skilled in the art as within the spirit and scope of the invention, which is limited only by the scope of the claims appended hereto.

What is claimed is:

1. A braking device for drive belts comprising a swivel arm, a rotatable idler attached to one end of the swivel arm and adjoining the drive belt, a swivel bearing attached to the other end of the swivel arm, damping elements acting in the swivel direction and spring elements acting in the swivel direction wherein the drive belt extends in a circumferential section of a ring shaped space surrounding said swivel bearing and extends tangentially a small distance to said swivel bearing and wherein said damping elements are arranged joining said circumferential section in said ring shaped space and essentially arranged diametrically opposite the drive belt relative to the swivel axis.

2. A braking device according to claim 1 wherein said damping elements are sector-shaped and act in an axial direction.

3. A braking device according to claim 1 wherein said spring element is a helical spring with axially arranged windings and includes a plurality of radial inside damping elements and a radial inside swivel bearing, said swivel axis of said swivel bearing being offset relative to the central axis of the helical spring.

4. A braking device according to claim 1 wherein at least one axial end of said swivel bearing is provided with a spiral-shaped helical spring arranged next to the side surface of said drive belt.

5. A braking device for drive belts comprising a swivel arm, a rotatable idler attached to one end of the swivel arm and adjoining the drive belt, a swivel bearing attached to the other end of the swivel arm, damping elements acting in the swivel direction and spring elements acting in the swivel direction wherein said damping elements are positioned asymmetrically to the swivel axis on a circumferential section of the swivel bearing diametrically opposite the drive belt relative to the swivel axis and wherein said spring element is a helical spring with axially arranged windings and includes a plurality of radial inside damping elements and a radial inside swivel bearing, said swivel axis of said swivel bearing being offset relative to the central axis of the helical spring.

6. A braking device for drive belts comprising a swivel arm, a rotatable idler attached to one end of the swivel arm and adjoining the drive belt, a swivel bearing attached to the other end of the swivel arm, damping elements coupled to said swivel arm for damping in the swivel direction, and spring elements coupled to said swivel arm and acting in the swivel direction, said damping elements being positioned asymmetrically to said swivel axis on a circumferential section of the swivel bearing diametrically opposite the drive belt relative to said swivel axis and wherein said spring element is a helical spring with axially arranged windings and includes a plurality of radial inside damping elements and a radial inside swivel bearing, said swivel axis of said swivel bearing being offset relative to the central axis of said helical spring.

* * * * *